United States Patent
Biester et al.

(10) Patent No.: US 9,494,252 B2
(45) Date of Patent: Nov. 15, 2016

(54) LOCKING DEVICE

(75) Inventors: Klaus Biester, Celle (DE); Norbert Lenz, Celle (DE)

(73) Assignee: OneSubsea IP UK Limited, London (GB)

( * ) Notice: Subject to any disclaimer, the term of this patent is extended or adjusted under 35 U.S.C. 154(b) by 143 days.

(21) Appl. No.: 14/125,033

(22) PCT Filed: Jun. 10, 2011

(86) PCT No.: PCT/EP2011/002859
§ 371 (c)(1),
(2), (4) Date: Apr. 28, 2014

(87) PCT Pub. No.: WO2012/167808
PCT Pub. Date: Dec. 13, 2012

(65) Prior Publication Data
US 2014/0251468 A1   Sep. 11, 2014

(51) Int. Cl.
*F16K 37/00* (2006.01)
*E21B 33/06* (2006.01)
(Continued)

(52) U.S. Cl.
CPC ......... *F16K 37/0041* (2013.01); *E21B 33/062* (2013.01); *F15B 15/264* (2013.01);
(Continued)

(58) Field of Classification Search
CPC ................ F16K 37/0041; F16K 31/042; F16K 37/0033; F15B 15/264; F15B 15/2861; E21B 33/062; Y10T 137/8225
(Continued)

(56) References Cited

U.S. PATENT DOCUMENTS 3,654,549 A * 4/1972 Maurer ............... F15B 15/2861
                                                    324/207.16
3,791,616 A * 2/1974 Le Rouax ............. E21B 33/062
                                                    251/1.3
(Continued)

FOREIGN PATENT DOCUMENTS

DE         10324838 A1    12/2004
DE    112004002838 T5     3/2007
(Continued)

OTHER PUBLICATIONS

International Search Report and Written Opinion dated Feb. 21, 2012 for PCT Application No. PCT/EP2011/002859 filed Jun. 10, 2011.

*Primary Examiner* — Craig Schneider
*Assistant Examiner* — Andrew J Rost
(74) *Attorney, Agent, or Firm* — Hrdlicka Chamberlain

(57) ABSTRACT

A locking device is used for locking at least a piston associated with an operating element of a valve, a choke, a blowout preventer or some other unit used in the field of oil/natural gas drilling and/or oil/natural gas production. The locking device comprises a sleeve, which is axially displaceable relative to the piston and which is threadedly engaged with a rotatably supported rod for displacement in an axial direction. The rod is drivingly connected to a motor. In order to be able to determine, by means of simple structural measures, the position of the piston for each of its positions in a sufficiently precise and reproducible manner, the locking device is provided with a position sensor, which extends from a fixed point through a longitudinal bore of the lock rod up to the hydraulic piston and by means of which a distance between the piston and the fixed point can be detected.

15 Claims, 2 Drawing Sheets

(51) Int. Cl.
*F15B 15/28* (2006.01)
*F15B 15/26* (2006.01)
*F16K 31/04* (2006.01)

(52) U.S. Cl.
CPC ......... F15B 15/2861 (2013.01); F16K 31/042 (2013.01); *Y10T 137/8225* (2015.04)

(58) Field of Classification Search
USPC .................. 251/1.1–1.3, 284, 285; 137/554; 163/363, 364, 85.4; 166/323, 363, 364, 166/85.4
See application file for complete search history.

(56) References Cited

U.S. PATENT DOCUMENTS

| | | | | | |
|---|---|---|---|---|---|
| 4,700,610 | A | * | 10/1987 | Bauer | F15B 9/03 73/9 |
| 4,879,440 | A | * | 11/1989 | Lymburner | H01H 3/16 200/47 |
| 5,295,907 | A | * | 3/1994 | Akkerman | F16D 27/105 192/56.33 |
| 6,843,463 | B1 | * | 1/2005 | McWhorter | E21B 33/062 137/601.2 |
| 6,969,042 | B2 | * | 11/2005 | Gaydos | E21B 33/063 251/1.1 |
| 7,300,033 | B1 | | 11/2007 | Whitby | |
| 2008/0196888 | A1 | | 8/2008 | Judge | |
| 2010/0152901 | A1 | | 6/2010 | Judge | |

FOREIGN PATENT DOCUMENTS

| | | |
|---|---|---|
| EP | 1280977 B1 | 7/2013 |
| WO | 2011006519 A1 | 1/2011 |

\* cited by examiner

LOCKING DEVICE

BACKGROUND

The invention relates to a locking device used for locking at least a piston associated with an operating element of a valve, a choke, a BOP (blowout preventer) or some other unit used in the field of oil/natural gas drilling and/or oil/natural gas production. The locking device comprises sleeve, which is axially displaceable relative to the hydraulic piston and which is threadedly engaged with a rotatably supported rod for displacement in an axial direction, said rod being drivingly connected to a motor such as an electric motor.

An example of a locking device is known from U.S. Pat. No. 7,300,033 B1. The locking device serves to lock a hydraulic piston which is used for displacing a slide of a BOP. The hydraulic piston is adapted to be axially displaced by means of a suitable hydraulic fluid in the open as well as in the closed position of the respective slide of the BOP. For locking the hydraulic piston at a specific position also without any hydraulic pressure being applied thereto, a lock rod is rotatably coupled to an electric motor. When the lock rod is rotated by the electric motor, a lock sleeve is displaced, said lock sleeve being threadedly engaged with the lock rod. The lock sleeve is brought into contact with a respective contact surface, normally in the interior of the hydraulic piston, so that the hydraulic piston will be fixed at said position by the displaced lock sleeve. Only when the lock rod is rotated once more for returning the lock sleeve to its starting position, thus releasing the hydraulic piston, said hydraulic piston can be displaced again by applying pressure thereto by means of the hydraulic fluid.

The locking device of U.S. Pat. No. 7,300,033 is disadvantageous insofar as it does not provide the possibility of detecting the position of the hydraulic piston and, consequently, the position of the slide of the BOP in real time and using it, if necessary, for locking by means of the lock sleeve. Even if the hydraulic piston should e.g. be located at a closed position, it is not exactly known how far the lock sleeve has to be displaced for fixing the hydraulic piston. This applies all the more to intermediate positions of the hydraulic piston between the open and the closed position of the respective slide.

Nor is it possible to find out whether a closed position of the hydraulic piston has actually been reached in response to the respective pressure applied thereto, or whether the hydraulic piston is prevented from arriving at its final closed position by other, in particular external influences. It is, however, normally necessary to precisely determine at least the closed position of the hydraulic piston so as to guarantee for said closed position that the slide of the BOP will actually be able to prevent a blow-out.

This applies analogously also to other positions of the piston and of the slide connected thereto.

SUMMARY

It is therefore the object of the present invention to allow, on the basis of simple structural measures, a sufficiently precise and reproducible determination of the position of the piston for each of its positions.

This object is achieved by the features of claim 1.

The present invention is especially characterized in that the locking device comprises a position sensor, which extends from a fixed point through a longitudinal bore of the rod up to the piston and by means of which a distance between the piston and the fixed point can be detected.

By means of these features according to the present invention, it is, on the one hand, possible to precisely detect the exact position of the piston and, consequently, of the slide or of some other operating element connected thereto. On the other hand, the sleeve can be advanced by means of the rod towards the piston in accordance with the detected distance so as to fix the piston at the respective position. This will also prevent the sleeve from being moved into contact with the piston too fast and with an excessively high speed of the rod. Such an excessively fast movement, which may lead to an impact of the sleeve on the piston, may otherwise cause damage to certain parts, such as the sleeve, the rod, the electric motor or the like.

The position sensor can also be used for finding out whether the piston has been displaced up to and into its open position for the purpose of opening or whether it may perhaps be located between the open position and the closed position or at the closed position.

In order to allow, in case there should be no power, the lock sleeve to be used also for displacing the piston to the closed position and in order to prevent, at the same time, an automatic turning back of the sleeve in response to an application of pressure thereto, the sleeve can be provided with an internal thread and the rod can be provided with an external thread, said internal thread and said external thread being in engagement with one another and extending each over at least part of the axial length of the sleeve and/or of the rod. The threads can transmit comparatively high forces and are, in addition, self-locking. For example, the threads may be trapezoidal.

This means that the sleeve can only be displaced by operating the motor once more, but not by an application of force via the piston or the operating element. In addition, it may even be of advantage when the self-locking effect is only eliminated when an adequate relief force on the piston is built up and when the sleeve can, only in this case, be displaced by means of the motor.

In order to be able to arrange certain parts of the locking device in a simple manner and attach them to the respective operating mechanism, the locking device can comprise a housing within which and on which at least the motor is arranged and the fixed point defined, and which can be adapted to be flange-mounted on an operating element housing. The respective fastening points used for flange-mounting can be standard fastening points, which may e.g. already exist for flange-mounting other units. In this way, the locking device with its components and in particular with the sensor is easily retrofittable.

In order to be able to transmit the rotation of the motor directly to the rod without any additional gear mechanism, the motor can be a torque motor. Such a torque motor is a slowly rotating electric motor that can be used for directly rotating the rod. In addition, such a torque motor is characterized by a compact structural design and by high rigidity. It is highly efficient, it can easily be integrated in the locking device in question and it is also highly dynamic.

Such a torque motor may especially comprise individual components so that it can directly be integrated in the locking device and requires simultaneously only little space. In addition, such a torque motor is easy to maintain, easy to retrofit and suitable for use in a large temperature range. An example of such a torque motor is described e.g. in PCT/EP2009/005186.

In order to prevent the torque motor from rotating the rod if unexpected difficulties should arise, the electric motor and the rod may have arranged between them a torque prevention mechanism, e.g., a safety clutch. If a safety clutch, such a safety clutch can be a torsion-proof and backlash-free safety clutch having a compact and simple structural design. A respective disengagement torque of the safety clutch can be adjusted easily and with high precision. Re-engagement can take place in angular synchronism. This means that the clutch will re-engage and be ready for use after precisely 360°, when a respective excessive load has been eliminated. It is also possible to implement the safety clutch as a ratchetting clutch. This means that the clutch will automatically re-engage and be ready for use at e.g. 30°, 45°, 60° and 90°. Likewise, the driving side and the output side may only be separated to a limited extent in response to excessive loads or the driving side and the output side may be separated permanently in response to excessive loads, said permanent separation being only eliminable by adequate signals supplied from outside.

An example of a safety clutch unit is described in PCT/EP2009/005186.

In order to provide a position sensor that can easily be used also in already existing locking devices, an example of a position sensor may comprise a sensor with one portion stationary with the fixed point and another portion moveable with the piston. As an example, such a sensor may comprise a sensor rod extending from the fixed point and a sensor tube supported on said sensor rod in a longitudinally displaceable manner, said sensor tube being secured, in particular releasably secured, to the piston at the sensor tube piston end facing away from the sensor rod. Examples of sensors of the type in question are described e.g. in EP 1 280 977, DE 11 2004 002 838, and DE 103 24 838. It follows that the sensor preferred in the present connection comprises two sensor parts which are inserted into one another in a substantially telescoping fashion, cf. the sensor rod and the sensor tube. Depending on the arrangement of these two parts relative to one another, a sensor signal will be obtained that can be converted into a distance between the piston and the fixed point. In this way, the above-mentioned distance can always be ascertained precisely and in a reproducible manner. In addition, the sensor has a simple structural design and it is very easy to maintain.

According to one embodiment, the position sensor may also be a magnetic position sensor. This means that the position of the sensor tube relative to the sensor rod is ascertained by displacing respective magnets relative to one another, and this position is then used as a basis for calculating the distance between the hydraulic piston and the fixed point.

Depending on the diameter of the longitudinal bore of the lock rod, it may be of advantage when the sensor tube is adequately guided within the longitudinal bore. This can easily be realized by providing the sensor tube with a sensor plug on the sensor end facing the sensor rod, said sensor plug being supported within the longitudinal bore such that it is adapted to be slidingly displaced therein. It is thus possible to guide the sensor tube, which moves relative to the sensor rod when the hydraulic piston is being displaced. The sensor plug can easily be adapted to the interior diameter of the longitudinal bore.

In this connection it may also prove to be advantageous when the sensor plug is implemented as a magnet carrier. Since the sensor plug is normally the part of the sensor tube having the largest diameter, the respective magnets can easily be provided thereon. The rest of the sensor tube is simply tubular in shape without comprising any additional parts.

The locking device may be hydraulically powered. If so, in order to prevent the hydraulic fluid from applying pressure to or soiling sensitive parts of the locking device within the respective housing, it may be of advantage when, at its end facing the fixed point, the longitudinal bore of the rod is adapted to be closed by means of a releasable plug, the sensor rod extending through this plug in sealing contact therewith. For example, the plug may be a releasably fastened screw-in plug.

In this connection, it should be pointed out that no relative movement takes place between the plug and the sensor rod, so that a good sealing effect will be given in this area also in the long run.

In order to be able to displace the sleeve without any influence on the piston and without any influence originating from the hydraulic fluid if the system is hydraulically powered, it will normally be of advantage when the rod and the sleeve screwed in position thereon are arranged at least partially within a longitudinal bore of a sliding sleeve. This sliding sleeve protects the respective parts of the locking device with respect to the piston as well as with respect to the hydraulic fluid.

This protection can be intensified when the outer surface of the sliding sleeve is sealed relative to the hydraulic piston so as to sealingly guide said hydraulic piston along the sliding sleeve. An ingress of hydraulic fluid between the sliding sleeve and the hydraulic piston and then between the sleeve and the rod or into the longitudinal bore of the rod will be prevented in this way.

In order to guarantee that, when the rod is being rotated, the sleeve will not rotate together therewith, the sliding sleeve may be provided with at least one guide element projecting radially inwards and engaging a guide groove on an outer surface of the sleeve. The engagement between the guide element and the guide groove fixes the sleeve in the direction of rotation, but allows a displacement in the axial direction. It is, of course, possible to provide a plurality of such guide elements along the guide groove or along the circumference of the sliding sleeve, the sleeve being then provided with a corresponding number of guide grooves.

One embodiment of such a guide element is a feather key.

In order to be able to use, if necessary, the sliding sleeve also for securing the rod in position, at least with respect to axial displacements, the sliding sleeve can be releasably secured in position in the interior of the operating element housing thus fixing the rod in the axial direction.

It is possible to provide for each operating element a locking device according to the present invention, said operating elements being, if necessary, also arranged in pairs for only one slide of a BOP. In this respect it may, however, suffice to provide for such an arrangement of pistons in pairs a locking device for only one piston. In the case of so-called RAM-BOPS respective operating elements are arranged in diametrically opposed relationship with one another individually or also in pairs relative to an oil-well bore. A locking device of the type in question can be used for all these units. This also applies to cases where the respective BOPS with operating elements are stacked one on top of the other.

DRAWINGS

In the following, an advantageous embodiment of the present invention will be explained and described in more detail on the basis of the enclosed figures of the drawing, in which.

DETAILED DESCRIPTION

Figure 1:
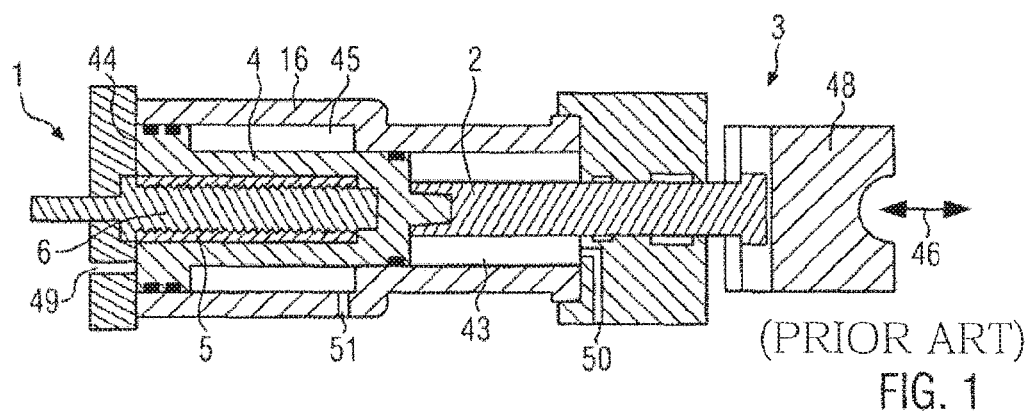
FIG. 1 shows a known example of a locking device.

FIG. 1 shows a longitudinal section through a locking device 1 for a blowout preventer 3 (BOP), which is known from U.S. Pat. No. 7,300,033 B1. The BOP components shown are essentially only a respective slide 48, which is adapted to be displaced to the right in FIG. 1 by means of an operating element 2. The operating element 2 is connected to a hydraulic piston 4. This hydraulic piston 4 is arranged at its open position. The hydraulic piston 4 is provided with a longitudinal bore having arranged therein a lock sleeve 5 and a lock rod 6. The lock rod 6 is rotatable, but supported such that it is not longitudinally displaceable. When the lock rod 6 is rotated, the lock sleeve 5 can be displaced in an axial direction 46 through adequately engaged female and male threads.

When, through pressure applied via the inlet bore 49, the hydraulic piston 4 is displaced to the right in FIG. 1, the lock sleeve 5 can be caused to follow up the hydraulic piston by rotating the lock rod 6 until the lock sleeve 5 comes into contact with the hydraulic piston 4 and fixes it at the position in question. In the course of this process, hydraulic fluid is discharged through a respective bore 50 or supplied therethrough so as to return the hydraulic piston to the open position.

Furthermore, a chamber is provided, cf. reference numeral 45, through which dead centre fluid can be supplied and discharged, cf. also bore 51.

Figure 2:
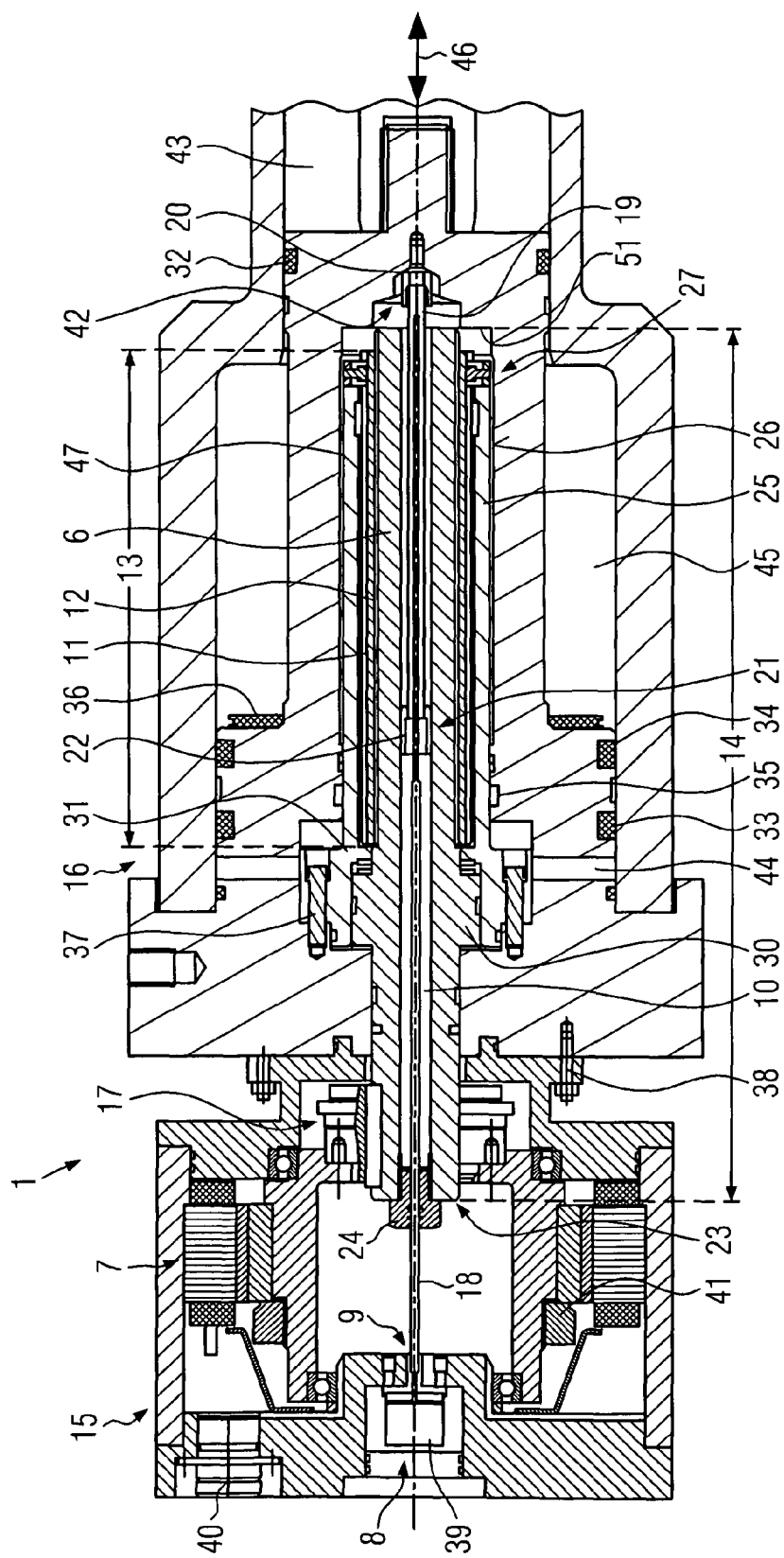
FIG. 2 shows a locking device embodiment according to the present invention.

FIG. 2 shows a longitudinal section, analogously to FIG. 1, through a locking device 1 according to the present invention. The structural design of the BOP is substantially analogous to that according to FIG. 1. In order to simplify matters, the respective BOP parts have been omitted in FIG. 2.

The hydraulic piston 4 is supported in an operating element housing 16 such that it is displaceable in the axial direction 46. The hydraulic piston 4 separates a plurality of chambers from one another in the interior of the operating element housing 16. A first chamber defines a pressure chamber 43, which is acted upon by hydraulic fluid so as to displace the hydraulic piston to the closed position, cf. also FIG. 1. This applies analogously to the other chambers, which define pressure chambers 44 and 45. The pressure chamber 44 has supplied thereto hydraulic fluid for displacing the hydraulic piston to the open position, and the pressure chamber 45 has supplied thereto dead centre fluid.

For sealing the hydraulic piston in the interior of the operating element housing 16, various sealing elements 32, 33 and 34 are provided. The hydraulic piston is additionally sealed relative to the outer surface 26 of a sliding sleeve 25 via a sealing element 35. This sliding sleeve 25 defines a part of the locking device 1 according to the present invention and is arranged in a respective internal or longitudinal bore of the hydraulic piston 4. One end of said sliding sleeve 25 is releasably secured to an end portion of the operating element housing 16 by means of a plurality of screws 37. In this area, the sliding sleeve is provided with a shoulder 31 which projects radially inwards into a respective longitudinal bore 47 of the sliding sleeve 25. A radial steplike projection 30 of a lock rod 6 is arranged between this shoulder 31 and the operating element housing 16. In this way, the lock rod is fixed in the axial direction 46 within the operating element housing 16 by means of the sliding sleeve 25, the lock rod being, however, rotatably supported.

The lock rod 6 extends through a bore in the operating element housing 16 up to and into the interior of a housing 15 of the locking device 1, said housing 15 being flange-mounted on the outer surface of the operating element housing 16. Within this housing 15 the lock rod 6 is rotatably connected to an electric motor 7 via a safety clutch 17. The electric motor 7 is implemented as a torque motor. The safety clutch decouples the rotary connection between the electric motor 7 and the lock rod 6, if the rotational resistance should become excessively high.

The lock rod 6 is provided with a longitudinal bore 10. This longitudinal bore 10 extends over the full axial length 14 of the lock rod 6. A position sensor 8 is disposed such that it extends through this longitudinal bore 10. Said position sensor 8 extends from a sensor head 39 up to an insertion bore 42 in the interior of the hydraulic piston 4. The sensor head 39 is fixed to the housing 15 and defines there a fixed point 9 for the position sensor 8. The position sensor 8 comprises a sensor rod 18 and a sensor tube 19 guided on said sensor rod 18 in a telescoping fashion. The sensor rod 18 extends essentially from the fixed point 9 or sensor head 39 up to a point close to the insertion bore 42. The sensor tube 19 is releasably secured in position in the insertion bore 42 and partially pushed onto the sensor rod 18. At the end 21 of the sensor tube 19 a sensor plug 22 is provided. Said sensor plug 22 is used as a magnet carrier and is adapted to an inner diameter of the longitudinal bore 10 of the lock rod 6. Fastening in the insertion bore 42 is effected via a respective piston end 20 of the sensor tube 19.

For closing the longitudinal bore 10 of the lock rod 6 within the housing 15, a respective end 23 of a screw-in plug 24 is screwed in position. This screw-in plug 24 is provided with sealing elements 41 which seal the sensor rod 18 that extends through the screw-in plug 24. A relative movement between the sensor rod 18 and the screw-in plug 24 does not take place, at least not in the axial direction 46. Instead, these two components only rotate relative to one another.

The housing 15 is also used for arranging the electric motor 7. This electric motor 7 is adapted to be fed with electric current from outside via a plug 40. The plug 40 also serves to transmit respective signals of the position sensor 8.

A lock sleeve 5 is arranged between the lock rod 6 and the sliding sleeve 25. The lock sleeve 5 has on the inner side thereof an internal trapezoidal thread 11 which is threadedly engaged with an external trapezoidal thread 12 provided on the outer surface of the lock rod 6. When the lock rod 6 is rotated via the safety clutch 17 by means of the electric motor 7, the lock sleeve moves to the right in FIG. 2 in the axial direction 46. This is supported by engagement of a guide element 27, which projects radially inwards and which is attached to the sliding sleeve 25. This guide element 27 engages, in the form of a feather key, a guide groove 28, which is arranged on the outer surface of the lock sleeve 5.

Due to this engagement between the guide element 27 and the guide groove 28, the lock sleeve 5 is supported such that it cannot be rotated, but displaced in the axial direction 46.

The lock sleeve 5 has an axial length 13 corresponding essentially to the length of the sliding sleeve 25 between the shoulder 31 and its open end.

When the hydraulic piston 4 has applied thereto hydraulic fluid in the pressure chamber 44, it will be displaced to the right in FIG. 2 in the axial direction 46 at most up to and into the closed position of the slide 48, cf. also FIG. 1. When the hydraulic piston 4 is being displaced, the sensor tube 19 is entrained, cf. the fixing of the piston end 20 of the sensor tube 19 in the insertion bore 42. Due to the fact that the sensor tube 19 is entrained, the sensor plug 22 is entrained as well. The movement of said sensor plug 22 relative to the sensor rod 18 results in the generation of a signal which can be converted into a distance between the fixed point 9 and the piston end 20. It can thus always be determined precisely where the hydraulic piston 4 is located. The distance in question can also be used for rotating, by actuating the electric motor 7, the lock rod 6 to such an extent that the lock sleeve 5 comes into contact with an internal shoulder 51 adjacent to the insertion bore 42 of the hydraulic piston 4. At this position of the lock sleeve 5, the hydraulic piston 4 is fixed at the respective position even if there is a decrease in pressure in the hydraulic fluid. The thread between the lock sleeve and the lock rod is implemented such that it is self-locking. An automatic turning back of the lock sleeve 5 relative to the lock rod 6 is not possible, not even if pressure should be applied to the hydraulic piston 4 via e.g. the slide 48 or the pressure chamber 43.

If the hydraulic supply should fail, it is possible to displace, by actuating the electric motor 7, the hydraulic piston 4 at least in the closed position by an adequate displacement of the lock sleeve 5 by means of rotating the lock rod 6.

Whenever the hydraulic piston 4 is displaced in the axial direction 46, the position of the hydraulic piston 4 is determined in real time and in a precisely reproducible manner by means of the respective distance between said hydraulic piston 4 and the fixed point 9. It can thus always be ascertained whether the hydraulic piston 4 is arranged e.g. at the closed position or at the open position or at any other intermediate position.

The distance determination in question is also used for displacing the lock sleeve 5 by means of the lock rod 6 so as to fix e.g. the hydraulic piston 4 at its closed position.

Figure 3:
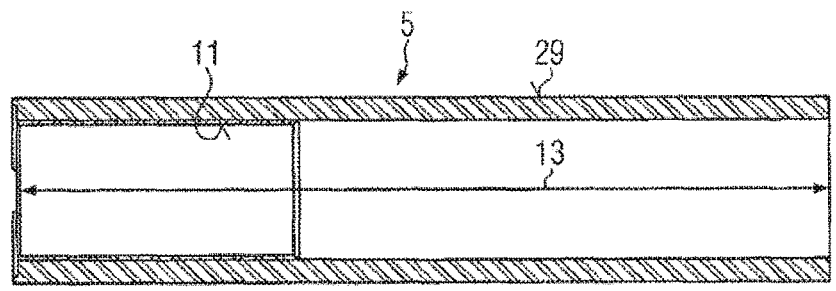
FIG. 3 shows an enlarged representation of a sleeve according to the embodiment shown in FIG. 2.
Figure 4:
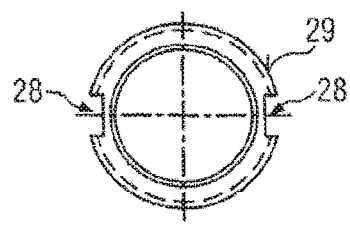
FIG. 4 shows an end view of the sleeve according to FIG. 3.

FIG. 3 shows an enlarged representation of the lock sleeve 5. The latter has a substantially simple tubular shape with an internal trapezoidal thread 11 along at least a part of the axial length 13 of the lock sleeve 5. In the embodiment shown, the outer surface 29 of the lock sleeve 5, cf. also FIG. 4, has formed therein two diametrically opposed guide grooves 28 which may extend over substantially the whole axial length 13. These guide grooves 28 are used, cf. also FIG. 2, for guiding guide elements 27 in the axial direction 46. The combined effect of the guide element and of the guide groove prevents a rotational displacement of the lock sleeve 5 when the lock rod 6 is being rotated.

FIG. 2 additionally shows damping elements 36 which, when the hydraulic piston 4 is arranged at the closed position, are in contact with the inner surface of the operating element housing 16, as well as screws 38 which are used for fixing the housing 15 to the outer surface of the operating element housing 16.

What is claimed is:

1. A locking device for locking at least a piston associated with an operating element of a valve, a choke, a blowout preventer (BOP), or some other unit used in the field of oil/natural gas drilling and/or oil/natural gas production, said locking device comprising:
   a motor;
   a rod drivingly connected to the motor, rotatably supported, and including a longitudinal bore;
   a sleeve axially displaceable relative to the piston and threadedly engaged with the rod for displacement in an axial direction; and
   a position sensor comprising:
      a sensor rod extending from a fixed point through the longitudinal bore of the rod up to the piston;
      a sensor tube supported on the sensor rod in a longitudinally displaceable manner; and
      wherein the position sensor is configured to detect a distance between the piston and the fixed point.

2. The locking device according to claim 1, wherein the sleeve includes an internal thread and the rod includes an external thread, said internal thread and said external thread being in engagement with one another and extending each over at least part of the axial length of the sleeve and/or of the rod.

3. The locking device according to claim 1, further including a housing within which and on which at least the motor is arranged and the fixed point defined, and which is adapted to be flange-mounted on an operating element housing.

4. The locking device according to claim 1, wherein the motor includes a torque motor.

5. The locking device according to claim 1, further including a torque prevention mechanism arranged between the motor and the rod.

6. The locking device according to claim 1, wherein the sensor tube is releasably secured to the piston at the sensor tube piston end facing away from the sensor rod.

7. The locking device according to claim 6, wherein at the end of the rod facing the fixed point, the longitudinal bore of the rod is adapted to be closed by means of a releasable plug, the sensor rod extending through the plug in sealing contact therewith.

8. The locking device according to claim 1, wherein the position sensor includes a magnetic position sensor.

9. The locking device according to claim 8, wherein the sensor tube is provided with a sensor plug on the sensor end facing the sensor rod, said sensor plug being supported within the longitudinal bore such that it is adapted to be slidingly displaced therein.

10. The locking device according to claim 9, wherein the sensor plug is implemented as a magnet carrier.

11. The locking device according to claim 1, wherein the rod and the sleeve screwed in position thereon are arranged at least partially within a longitudinal bore of a sliding sleeve.

12. The locking device according to claim 11, wherein the outer surface of the sliding sleeve is sealed relative to the piston so as to sealingly guide the piston along the sliding sleeve.

13. The locking device according to claim 11, wherein the sliding sleeve includes a guide element projecting radially inwards and engaging a guide groove on an outer surface of the sleeve.

14. The locking device according to claim 13, wherein the guide element includes a feather key.

15. The locking device according to claim 11, wherein the sliding sleeve is releasably fixed in position in an interior of an operating element housing thus fixing the rod in the axial direction.

* * * * *